United States Patent
Cinqualbre et al.

(10) Patent No.: US 8,596,522 B2
(45) Date of Patent: Dec. 3, 2013

(54) METHOD FOR MAKING AT LEAST ONE IDENTIFIER AND SECURING THE READING THEREOF BY A DIGITAL PEN ASSOCIATED WITH A SCREEN SHEET, AND MEANS FOR IMPLEMENTING SAME

(76) Inventors: Jacques Cinqualbre, Rosheim (FR); Damien Uhlrich, Saint Nicolas de Port (FR)

( * ) Notice: Subject to any disclaimer, the term of this patent is extended or adjusted under 35 U.S.C. 154(b) by 491 days.

(21) Appl. No.: 12/734,340

(22) PCT Filed: Oct. 21, 2008

(86) PCT No.: PCT/FR2008/001475
§ 371 (c)(1),
(2), (4) Date: Jun. 17, 2010

(87) PCT Pub. No.: WO2009/087315
PCT Pub. Date: Jul. 16, 2009

(65) Prior Publication Data
US 2011/0007036 A1 Jan. 13, 2011

(30) Foreign Application Priority Data
Oct. 25, 2007 (FR) .................................. 07 07504

(51) Int. Cl.
*G06F 17/00* (2006.01)
(52) U.S. Cl.
USPC ...... 235/375; 235/472.01; 382/180; 382/184; 382/188; 382/194; 382/313; 345/166; 345/175; 345/179; 345/180

(58) Field of Classification Search
USPC ............. 235/462, 375, 472.01; 382/180, 184, 382/188, 194, 313, 314, 321; 345/166, 175, 345/179, 180; 178/18.01, 18.09
See application file for complete search history.

(56) References Cited

U.S. PATENT DOCUMENTS

| | | | |
|---|---|---|---|
| 5,051,736 A | 9/1991 | Bennett et al. | |
| 5,442,147 A | 8/1995 | Burns et al. | |
| 5,477,012 A | 12/1995 | Sekendur | |
| 5,652,412 A | 7/1997 | Lazzouni et al. | |
| 5,661,506 A | 8/1997 | Lazzouni et al. | |
| 5,852,434 A | 12/1998 | Sekendur | |
| 7,134,606 B2 | 11/2006 | Chou | |
| 2005/0211783 A1 | 9/2005 | Chou | |

FOREIGN PATENT DOCUMENTS

WO WO 2006/049574 5/2006

*Primary Examiner* — Michael G Lee
*Assistant Examiner* — Tabitha Chedekel
(74) *Attorney, Agent, or Firm* — Law Offices of Steven W. Weinrieb

(57) ABSTRACT

The invention relates to a method for identifying sheets on which is added one identifier or more comprising a combination of juxtaposed screen cells. The method comprises two parts. The first part describes a means for making the differentiating identifiers and the addresses associated with the content areas forming the sheets. The second part describes a means for processing the information of the digital pen transmitted to the computer processing unit by one or more automatic or semiautomatic post-processing operations. The two non-separable parts of this method thus compensate for the potential handling errors of a user who must write or transcribe information onto screen sheets using a digital pen.

19 Claims, 8 Drawing Sheets

Figure 1:
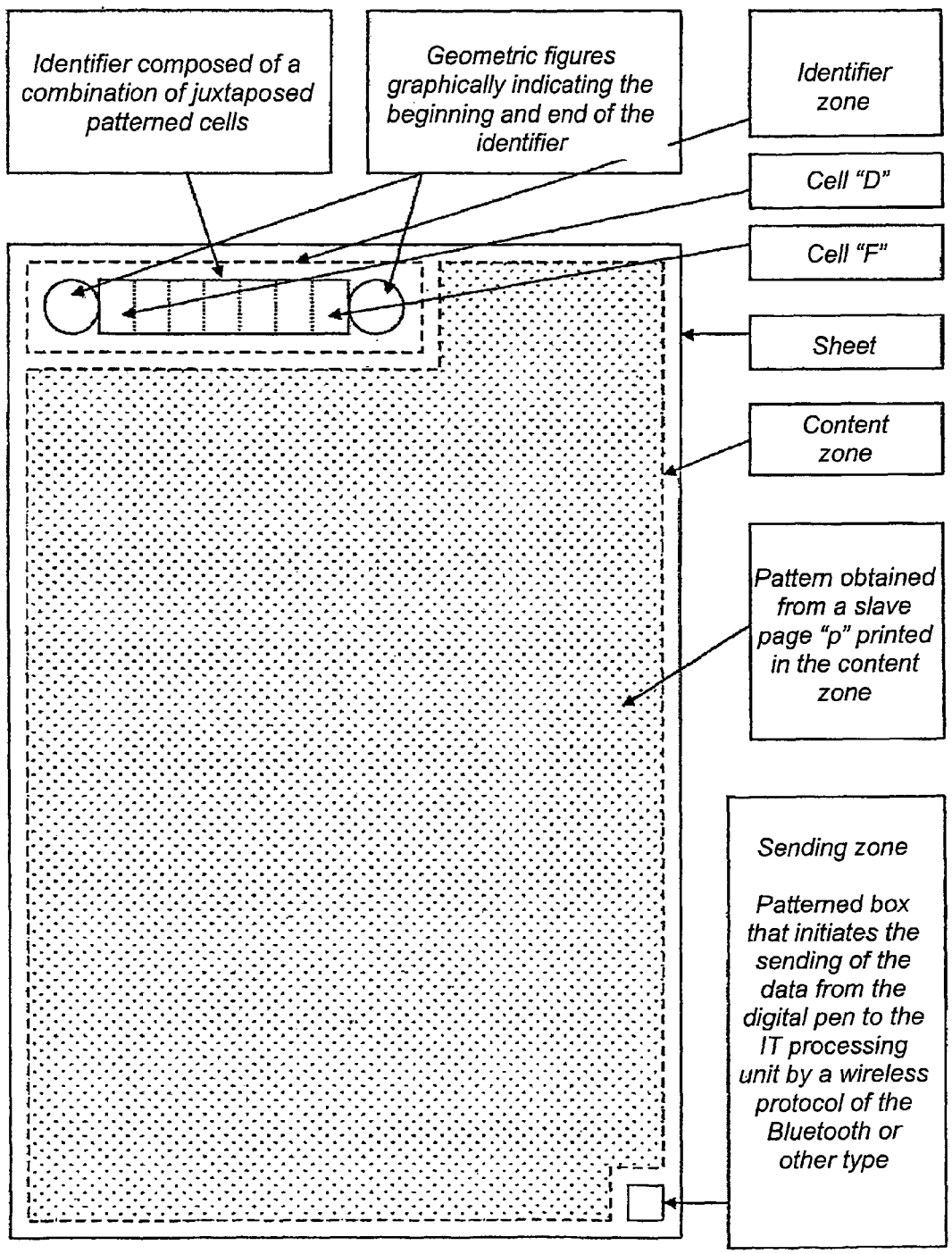

METHOD FOR MAKING AT LEAST ONE IDENTIFIER AND SECURING THE READING THEREOF BY A DIGITAL PEN ASSOCIATED WITH A SCREEN SHEET, AND MEANS FOR IMPLEMENTING SAME

FIELD OF THE INVENTION

The invention relates to a method for constructing at least one identifier and for securing the reading thereof by means of a writing and reading instrument associated with a patterned or partly patterned sheet.

The invention also relates to a system grouping the means intended to implement the method according to the present invention.

DEFINITIONS

For better understanding of the invention, the definitions of the most important words and terms are given below:

Sheet: physical writing surface, which may be, for example, a paper sheet.

Pattern: position code with which the coordinates (x, y) of the set of points constituting a surface may be represented.

Patterned sheet: physical writing surface on which a position code has been established or printed, preferably based on a flat physical substrate known as a writing tablet.

Digital pen: writing instrument with a pen body with writing tip and viewing means physically associated with an electronic system (camera, light source, CCD transducer, microprocessor, memory, transmission system, etc.) that permits it to recognize and record the coordinates (x, y) of the set of points constituting its traces by interpreting the pattern established or printed on a sheet.

General pattern: theoretical total surface that a position code is capable of encoding.

Page: rectangular surface resulting from the virtual subdivision of the general pattern. This subdivision is intended, for example, to pattern one or more sheets of different sizes (A5, A4, A3, etc.).

Cell: rectangular surface resulting from the virtual subdivision of a page.

Patterned cell: cell established or printed on part of a sheet.

Identifier: combination of several patterned cells, preferably grouped by juxtaposition, this combination being intended among other purposes to make unique the sheet in question, on which the identifier has been established or printed.

Identifier zone: part(s) of the surface of a sheet in which an identifier has been established or printed.

Content zone: patterned or partly patterned remaining surface once the identifier zone or zones has or have been inserted on the sheet in question.

PRIOR ART

Several methods exist that permit a user to transmit, to an IT processing unit, graphical information items written, traced or drawn by hand on a sheet.

These methods are based on the use of a sheet, such as a paper sheet, on which a position code (pattern) has been established or printed, together with a digital pen.

Descriptions of these methods are found in U.S. Pat. Nos. 5,852,434; 5,477,012; 5,661,506; 5,051,736; 5,652,412 and in 5,442,147.

Among these methods there can be cited, for example, that developed by the ANOTO Company, which proposes a general pattern with which a total surface of up to 60 million $km^2$, according to their technical data, can be encoded.

To exploit this general pattern in the context of using patterned sheets of much smaller surface, such as paper sheets in A4 size, for example, ANOTO has virtually subdivided its general pattern into addressed pages. Thus each of these pages bears its own address constructed as follows: segment No., shelf No., book No., page No. For example, there is pictured a paper sheet of A4 size on which a page having the address 156.25.89.17 has been printed. This means that this A4 surface unit represents page No. 17, which has been virtually sampled from book No. 89, which belongs to shelf No. 25, which in turn is part of segment No. 156 of the general pattern of 60 million $km^2$.

In this context, the digital pen, rather than locating the absolute position of what is in the course of being written relative to the general pattern of 60 million $km^2$, will locate on the one hand the relative position of what is in the course of being written on the said sheet of A4 size and on the other hand the address of the page (segment No., shelf No., book No., page No.) printed thereon.

According to this principle, it is possible to differentiate sheets, provided that a page whose address (segment No., shelf No., book No., page No.) is different has been printed for each of them.

KT International INC proposes another method making it possible to identify, in unique manner, sheets in the case in which the addresses of the pages printed on these sheets are identical. This method is described in U.S. Pat. No. 7,134,606.

To do so, there is added to each sheet patterned by pages having identical addresses its own identifier, which is composed of a combination of patterned cells having different addresses, in this way making each of the sheets unique. This patent is analyzed below.

Description of U.S. Pat. No. 7,134,606:

As defined in the foregoing, a unique address of type segment.shelf.book.page is associated with each of the pages obtained from the general pattern.

There are defined n master pages having as address "p(a)" (a ranging between 1 and n), to be used as the base for construction of the identifier.

Each of these master pages having address "p(a)" is divided into cells "c(i)" defined according to the pair of the following coordinates: [x(c(i)) beginning, y(c(i)) beginning; x(c(i)) end, y(c(i)) end]. Each cell "c(i)" is associated with a number as a function of its coordinates, for example from i=1 to i=400 in the case in which each of the master pages would be divided into 400 cells.

On each sheet there is inserted, outside the content zone having identical address for all sheets, an ordered series of juxtaposed patterned cells obtained from master pages having addresses "p(a)".

Let us consider that we are using four master pages having addresses p(1), p(2), p(3) and p(4) (where p(1)≠p(2)≠p(3)≠p(4)) to create the unique identifier. The latter will be constructed from a combination of four cells as follows: c(w, p(1)); c(x, p(2)); c(y, p(3)); c(z, p(4)), with w, x, y and z ranging between i=1 and i=400 in the case of this example. Thus, if w=3, if x=56, if y=238 and if z=123, the digital pen will understand that it has just read an identifier composed of four numbers: 3.56.238.123.

The combination of these cell numbers creates a new address permitting identification of each sheet.

In this context, the three steps to implement this identifier system are the following:

Step 1: selection of n master pages, which will always be used to construct the identifiers.

Step 2: selection of one cell per master page.

Step 3: juxtaposition of the n cells of the n master pages on the sheet comprising the content zone.

Before writing on the content zone, the user checks each box of the identifier or traces a continuous line on the latter with the digital pen. This permits the IT processing unit to associate the data written in the content zone with this identifier for the same sheet when the digital pen is replaced in its storage and data-discharge holder of the "USB" inkwell type.

The Problem

This method described by KT International INC in U.S. Pat. No. 7,134,606 relates to a very particular application of electronic voting.

In this context, two hypotheses are formulated:

The digital pen sends its data in a continuous stream to the IT processing unit or else is replaced in its storage and data-discharge holder of the "USB" inkwell type as soon as the user has finished filling in the content zone of a sheet associated with its identifier.

By virtue of a control screen linked to the IT processing unit, the user verifies in real time that his traces on the identifier and in the content zone on the sheet are correctly displayed and/or that the IT processing unit is executing the proper processes according to the functions associated with the zones filled in by the digital pen.

For broader use of this method in multiple applications, however, such as a businessman filling in patterned meeting report cards with a digital pen, a technician filling in patterned quality control forms with a digital pen, a physician filling in patterned prescription sheets with a digital pen, it is possible that those persons, using the digital pen, in the course of the same working session, had to fill in a large number of different sheets having their own identifier (which makes them unique) before replacing the digital pen in its storage and data-discharge holder connected to the IT processing unit.

Consequently, the users are unable to verify in real time that what they are filling out by hand on the sheets will be processed correctly by the IT processing unit.

In this context, the user may make manipulation errors before replacing the digital pen in its storage and data-discharge holder without being able to correct them in real time. Several manipulation errors can be cited, such as:

the case in which the user checks/traces the cells of the identifier in the wrong order and/or in reverse before starting to write in the content zone, the case in which the user checks/traces only part of the cells of the identifier before starting to write in the content zone, the case in which the user forgets to check/trace the cells of the identifier before starting to write in the content zone.

Beyond the fact that U.S. Pat. No. 7,134,606 of KT International INC does not describe methods for achieving a technical solution to respond to this problem, the method described for constructing the identifier in U.S. Pat. No. 7,134,606 of KT International INC does not make it possible to implement the means of the invention described hereinafter.

BRIEF DESCRIPTION OF THE INVENTION

The present invention, described in detail in the following sections of this patent, proposes a new means with which sheets whose content zone is associated with identical and/or different addresses (segment No., shelf No., book No., page No.) can be made unique by insertion of their own identifier (composed of a combination of grouped patterned cells).

The method according to the present invention is split into two indissociable parts. The first relates to a way of constructing the differentiating identifiers and of choosing the addresses of pages established or printed in the content zones making up the sheets. The second relates to a way of processing the information items of the digital pen transmitted to the IT processing unit by automatic or semi-automatic post-processing operations.

In this way the two parts, indissociable from one another, of the method according to the present invention make it possible to alleviate the potential manipulation errors of the user, cited hereinabove by way of example in the section "The Problem".

They also make it possible in non-limitative manner to endow the identifiers with other properties or to open to other uses such as:

the possibility of varying the size of the identifiers by acting on the number of juxtaposed cells in order to adapt to surface constraints, such as, for example, the case of use of sheets having very reduced size, without jeopardizing the coherence of the method, the possibility of positioning the zone or zones of the identifier anywhere in the sheet without causing it to lose its properties of encoding of position representing the coordinates (x, y) at the location where the identifier has been inserted, the use of identifiers to designate a person, a function or any object other than a sheet.

To this end the invention relates to a method for constructing and composing, on at least one sheet, at least one identifier on the basis of at least one sampling of at least one cell in at least one page obtained from a general pattern and for creating a patterned or partly patterned content zone on which the hand of a user writes or makes graphical signs, this content zone being obtained by at least one sampling of at least one cell in at least one page obtained from a general pattern, a method for securing the reading of the identifier by means of a digital writing and reading instrument associated with at least one sheet, this method proving to be additionally special in that:

there are defined n "master" pages P having the address "P(ai)" ($1<i<n$), each divided into n1 cells (C(l) ($1<l<n1$)) to form at least one part of the identifier by sampling of at least one cell and grouping, there is defined a special master page having the address "P(a1)" dedicated to the beginning of each identifier, in which there is sampled one cell "D" of the beginning of each constructed identifier, there is defined a special master page having the address "P(a2)" dedicated to the end of each identifier, in which there is sampled one cell "F" of the end of each constructed identifier, there are defined m "slave" pages "p" having the address "p(bj)" ($1<j<m$), each divided into m1 cells "c(J)" $1<J<m1$ to form each content zone of each writing surface by sampling and grouping, for a given sheet, there is inserted, between the first cell "D" and the last cell "F" of each identifier, a cell c(J) sampled from a slave page "p" whose address is identical to that of the cells c(J) serving to constitute the content zone belonging to this same sheet, for the other cells C(l) of the same identifier, which are neither the cell "D" nor the cell "F" nor the cell c(J), there is or are chosen an address or addresses "P(ai)" in random manner or according to an algorithm, the identifier is acquired by passing the digital writing and reading instrument over all the cells of the identifier, the content zone is used by writing with the digital writing and reading instrument in this zone on the patterned paper, the writing result is sent in the form of a succession of data to an IT processing unit, the data corresponding to this result are filtered and processed before final use thereof.

The invention also relates to the system grouping the means intended for implementation of the method described hereinabove.

LIST OF FIGURES

Figure 2:
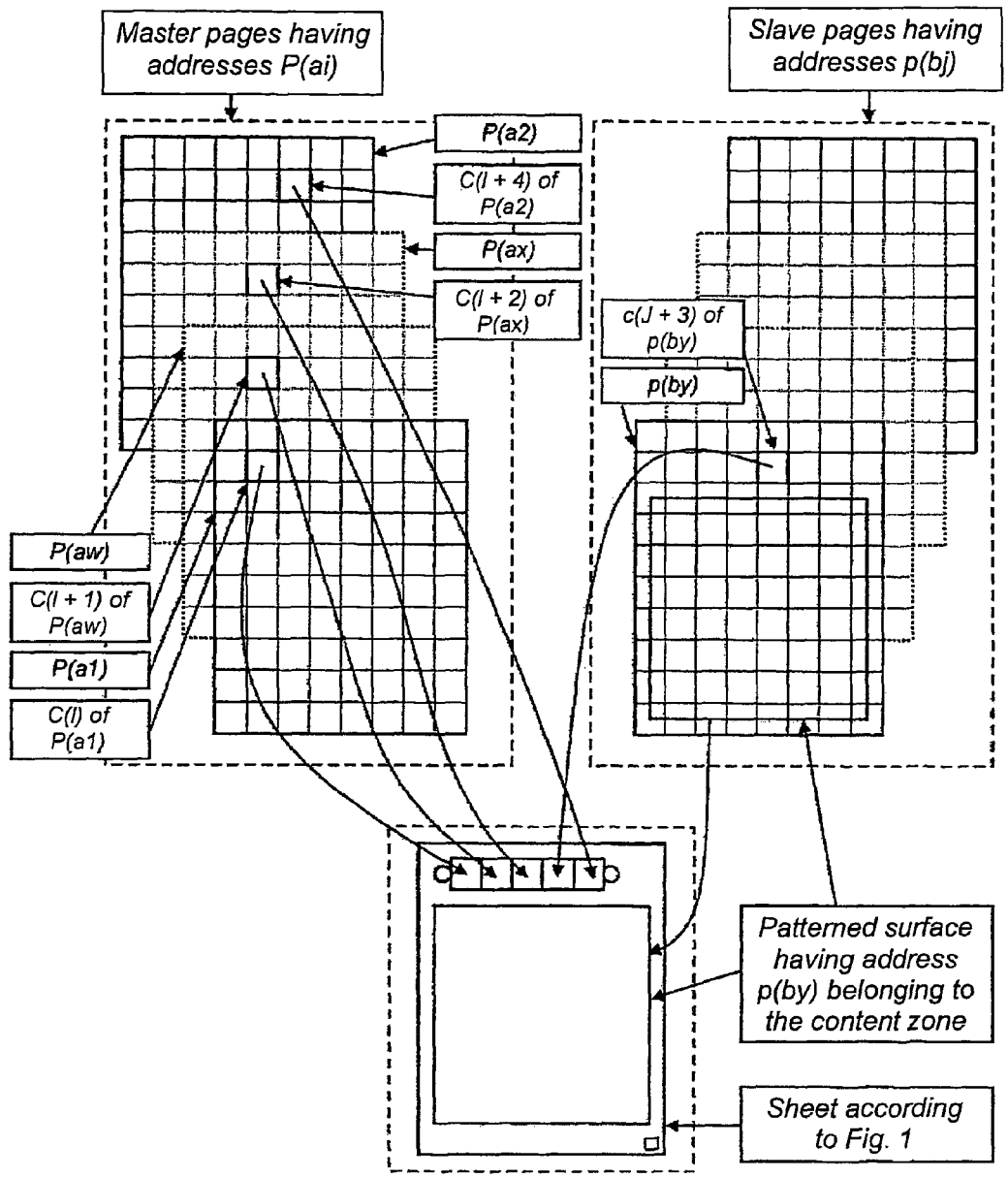
Figure 3:
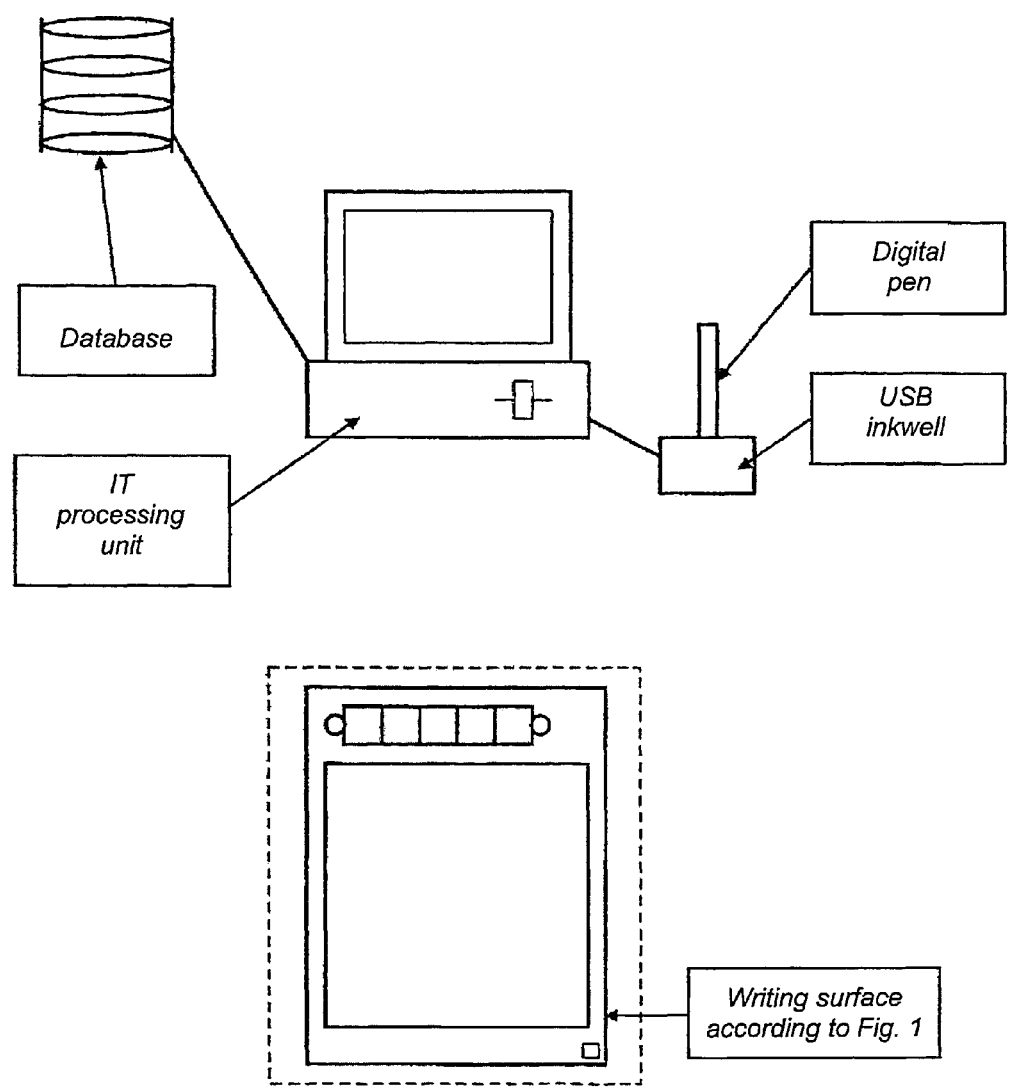
Figure 4:
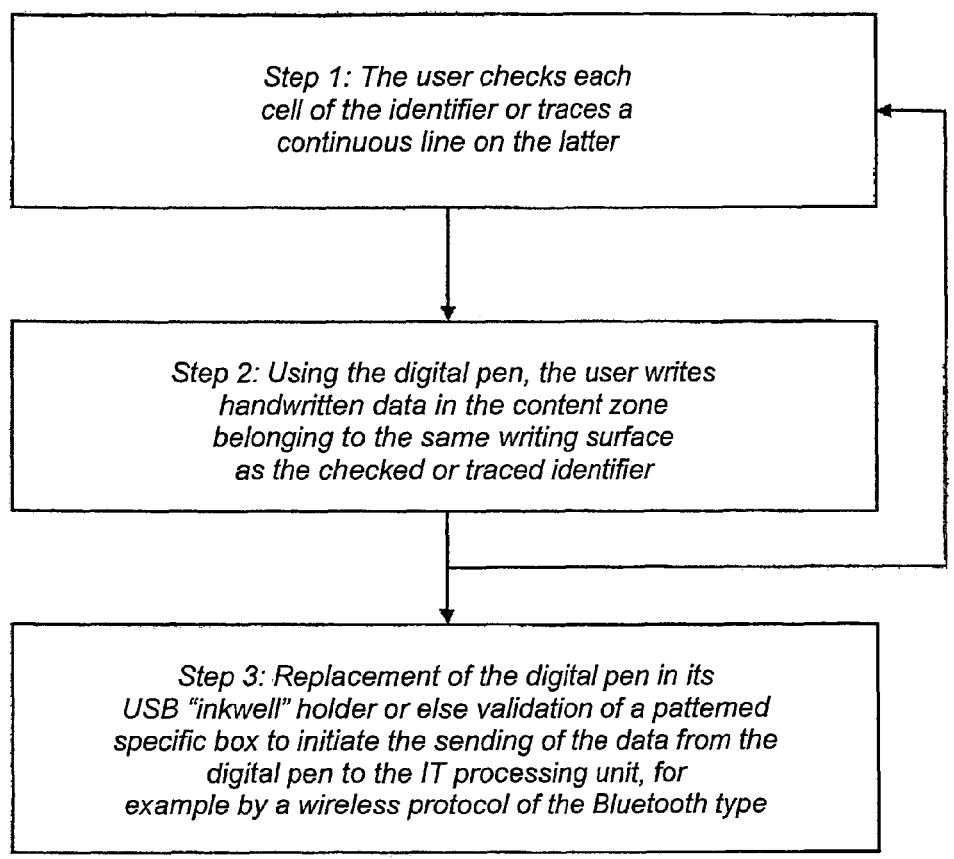
Figure 5:
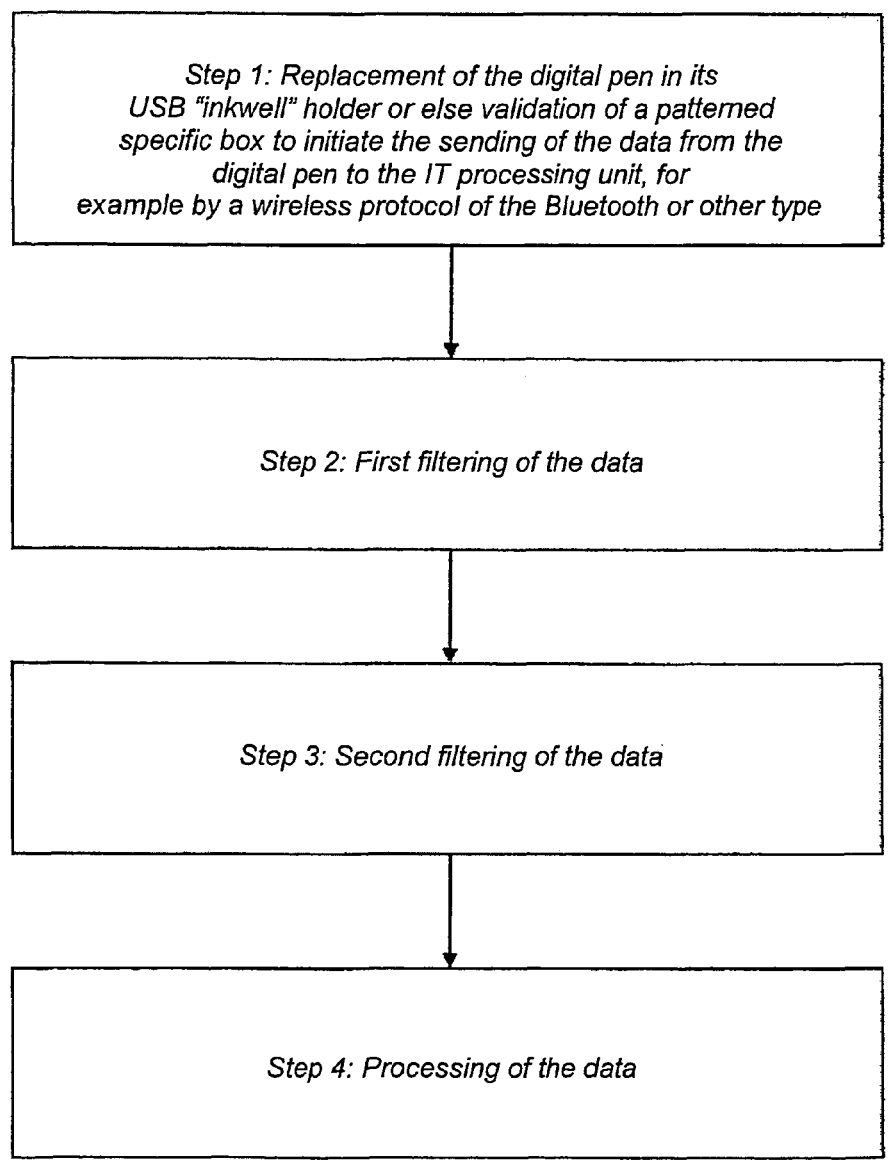
Figure 6:
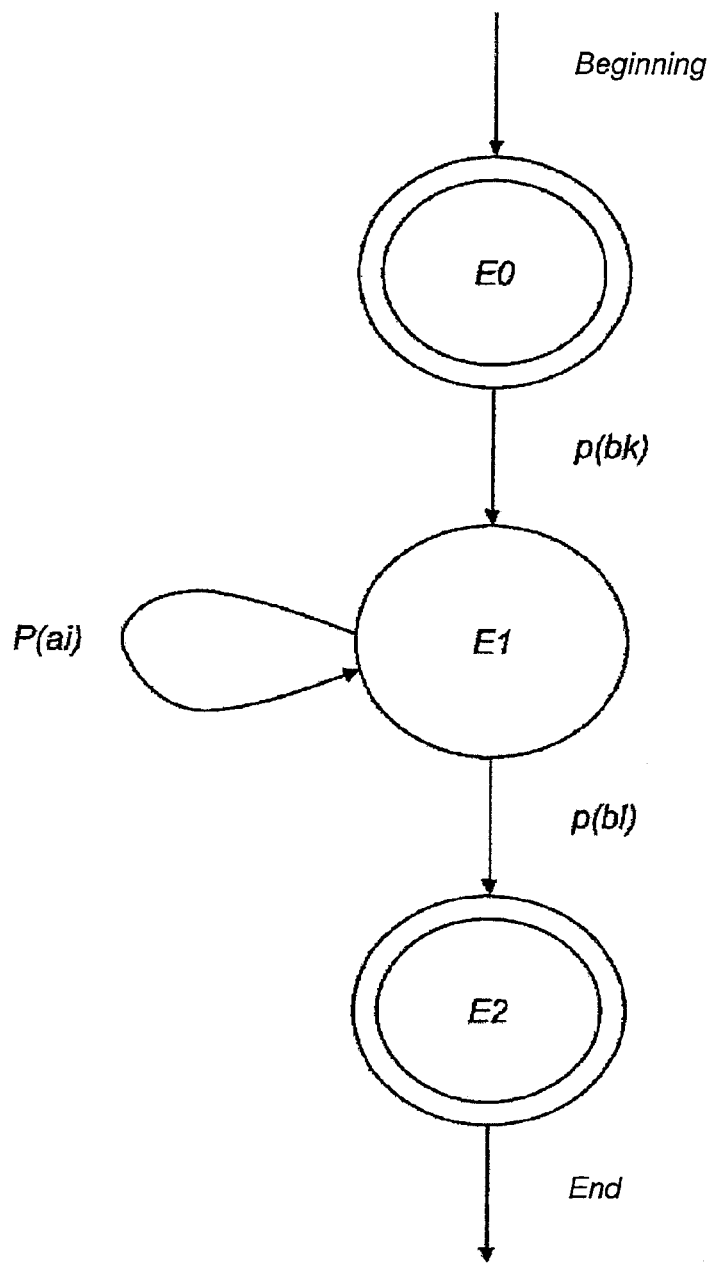
Figure 7:
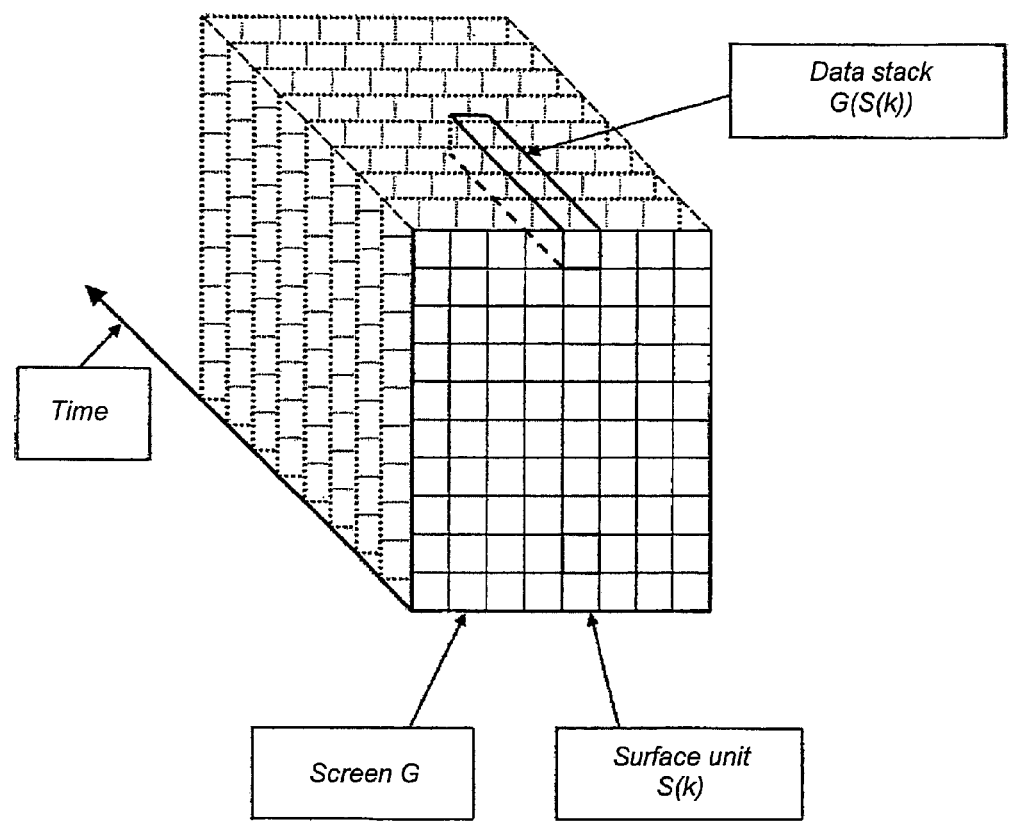
Figure 8:
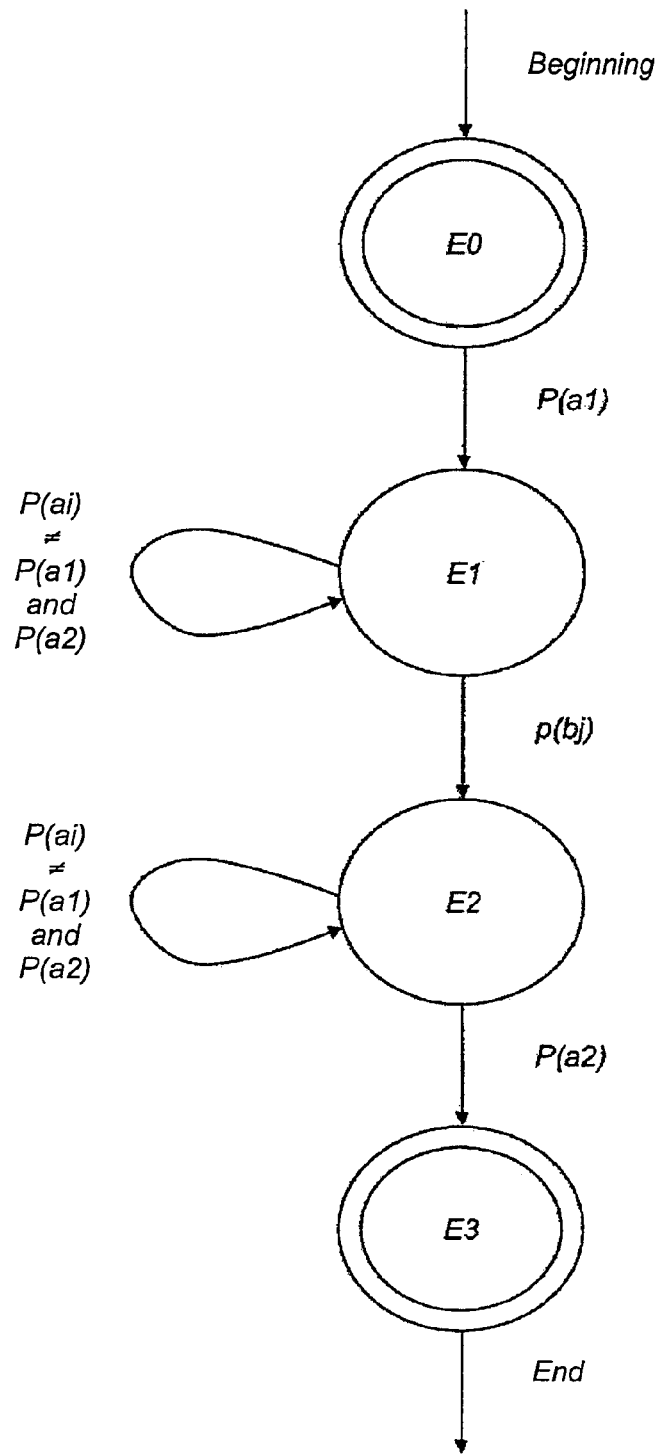

The present method will be readily understood by reading the description hereinafter, provided by way of non-limitative example with reference to the attached drawings, wherein:

FIG. 1 is a schematic view representing a sheet composed of an identifier constructed on the basis of a combination of patterned cells and of a completely patterned content zone, FIG. 2 is a graphical representation showing the method of construction of at least one identifier according to the present invention, FIG. 3 is the general diagram of the architecture of the system making it possible to implement the method according to the present invention, FIG. 4 is an organizational diagram from the user's viewpoint of successions of instructions concerning the sequence of filling in a sheet composed of an identifier constructed on the basis of a combination of patterned cells and of a content zone, FIG. 5 is a flow chart of successions of phases relating to automatic or semi-automatic processing of data transmitted by the digital pen to the IT processing unit, FIG. 6 is the representation of an automatic unit making it possible to apply filtering of the data sent to the IT processing unit by the digital pen, FIG. 7 is a representation of a virtual data-filtering screen over which the automatic unit represented in FIG. 8 can travel, for example, over a plurality of trajectories to effect processing of the data received by the IT processing unit, FIG. 8 is the representation of an automatic unit making it possible to effect processing of the data sent to the IT processing unit by the digital pen.

DETAILED DESCRIPTION OF THE INVENTION

The method of constructing at least one identifier and of securing the reading thereof and the means for implementing same according to the present invention will now be described with reference to the various figures.

Description of FIG. 1—Patterned Sheet Bearing the Identifier.

The description hereinafter, which is an example of implementation of the method relating to this invention, will be based on a conventional plain paper. The paper may have the form of an isolated sheet or sheets, of a conventional notebook or notepad, or of a pad, spiral-bound or held together by a clip.

Two or three distinct zones will exist on the sheet available to the user:

The first zone is known as the "identifier zone", containing the sheet identifier composed of n patterned cells, for example juxtaposed in one or more blocks (to facilitate understanding of the present invention, the description hereinafter will be limited, by way of example, to a single block of juxtaposed adjacent cells). This zone may be positioned in variable manner on the sheet. The general contour of the elements of the identifier will preferably be graphically visible to the user. It will also be possible to mark graphically, by indicators (simple geometric forms such as squares, circles, etc.), the location at which the writing line of the digital pen must begin and the location at which it must end (these graphical geometric indicators of the beginning and end may or may not be patterned figures, and in the case of a pattern this may or may not be meaningful).

The second zone is known as the "content zone". Within the context of this example, it is patterned over its entire surface and situated in the interior of the sheet. It is on this content zone that the user will write handwritten data using the digital pen. Depending on the applications, the content zone will be blank or else structured by fields to be filled in such as, for example: quality control forms, maintenance report forms, administrative forms, etc.

The third zone will be necessary only in the case of use of a digital pen having the abilities to transmit data by a wireless communication protocol of the Bluetooth or other type. It is known as "sending zone". It corresponds to a dedicated patterned box, whose contour preferably will be graphically visible to the user.

Description of FIG. 2—Construction of the Identifier by Grouping of Cells.

The method of constructing the identifier will now be described by using the term juxtaposition for the cells constituting the identifier, but without intending to be limited in manner of grouping them.

As defined in the foregoing, a unique address of the type segment.shelf.book.page is associated with each of the pages obtained from the general pattern.

There are defined n master pages "P" having as address "P(ai)" (i ranging between 1 and n) to serve as basis for construction of the identifier. There will be dedicated, for example, 256 master pages, having the addresses P(a1), P(a2), P(a3) to P(a256) respectively.

Each of these master pages having the address "P(ai)" is divided into n1 cells "C(l)" (l ranging between 1 and n1) defined according to the pair of the following coordinates: [x(C(l)) beginning, y(C(l)) beginning; x(C(l)) end, y(C(l)) end].

Within the context of this example, each master page will be divided into 400 juxtaposed cells from C(1) to C(400) (in this context, n1=400). By convention, and as an example, it may also be chosen that the master pages will be composed of 40 lines of 10 juxtaposed cells and that the latter will be numbered from 1 to 10 for the first line, from 11 to 20 for the second line, from 21 to 30 for the third line, etc.

For a given identifier, each patterned cell number l involved in the composition thereof will be different. For example, a horizontal identifier composed of 5 juxtaposed patterned cells and conforming with the convention chosen in the foregoing will be given by:

C(l) sampled on master page av, having as address P(av), then C(l+1) sampled on master page aw, having as address P(aw), then C(l+2) sampled on master page ax, having as address P(ax), then C(l+3) sampled on master page ay, having as address P(ay), then C(l+4) sampled on master page az, having as address P(az).

The numbers v, w, x, y and z may be chosen randomly or according to another algorithm among the n master pages numbered from i=1 to i=256 in the context of the example.

In addition, among the n master pages there will be dedicated two special master pages having as addresses, for example, P(a1) and P(a2), in each of which there will be sampled one cell, one "D", to be placed at the beginning, and the other "F", to be placed at the end of each identifier constructed according to the present method. In this way, in the context of the foregoing example of the horizontal identifier composed of five patterned cells, av will be equal to a1 and az will be equal to a2.

These operations permit the following processing steps, described hereinafter in the present patent:
  determining whether the traces of the digital pen are positioned on the identifier zone or on the content zone,
  recognizing the relative position of the points constituting the traces relative to the sheet, regardless of the addresses P(ai) associated with the patterned cells of the identifier,
  determining the beginning and end of the identifier by virtue of the cells D and F,
  determining whether the user has traced/checked all patterned cells of the identifier in the correct order or in the wrong order, one time or several times, etc.

On the other hand, there are defined m slave pages "p" having as address "p(bj)" (j ranging between 1 and m) to pattern the content zones of each sheet. There will be dedicated, for example, 256 slave pages having the addresses p(b1), p(b2), p(b3) to p(b256) respectively.

Each of these slave pages having the address "p(bj)" is divided into m1 cells "c(J)" (J ranging between 1 and m1) defined according to the pair of the following coordinates: [x(c(J)) beginning, y(c(J)) beginning; x(c(J)) end, y(c(J)) end]. For the method to function, it is necessary that x(c(J)) beginning=x(C(l)) beginning, y(c(J)) beginning=y(C(l)) beginning, x(c(J)) end=x(C(l)) end, y(c(J)) end=y(C(l)) end and that n1=m1.

In this way, when an identifier is positioned on a sheet assumed to be patterned over its entire surface by a slave page having address p(bj) divided into cells c(J) (in fact, for ease of understanding of this explanation, it is assumed that the content zone is entirely patterned with a slave page having address p(bj) and that it covers the entire surface of the sheet) and, if l=J, the cells c(J), except for one of the content zone, will be replaced by the cells C(l) constituting the identifier. The cell c(J) of the content zone that will not be replaced in the identifier may be placed anywhere between the first cell "D" of the identifier sampled in the master page having address P(a1) and the last cell "F" of the identifier sampled in the master page having address P(a2).

Consequently, in the example discussed in the foregoing, a horizontal identifier composed of 5 patterned cells and conforming with the chosen convention (40 lines of 10 juxtaposed cells numbered from 1 to 10 for the first line, from 11 to 20 for the second line, from 21 to 30 for the third line, etc.), if it is assumed that the identifier is positioned in the upper left corner of the sheet and if the method described in this way is applied, there will be:
  C(1) sampled in master page a1 having as address P(a1),
  C(2) sampled in master page aw having as address P(aw),
  C(3) sampled in master page ax having as address P(ax),
  c(4) sampled in slave page by having as address p(by),
  and C(5) sampled in master page a2 having as address P(a2).

The numbers w and x will be chosen from 1=3 to i=256 and necessarily will be different from i=1 and i=2 (reserved for cells D and F). The number "y" range between j=1 and j=256.

Proceeding further in the example, and if it is assumed that a1 is master page No. 1, a2 is master page No. 256, aw is master page No. 123, ax is master page No. 95 and by is slave page no. 52, the digital pen will understand that it has just read an identifier composed of 2 numbers: 123.95 (the order is important) and that this identifier is associated with the content zone whose slave pattern printed in the identifier is sampled from slave page No. 52.

Description of FIG. 3—General Diagram of the Architecture of the System.

FIG. 3 is the general diagram of the architecture of the system for securing the reading of identifiers by means of a digital pen, which according to its definition is a writing and reading instrument and, in conformity with the method according to the invention, is associated with the patterned paper.

It comprises a sheet according to the description of FIG. 1.

It also comprises a digital pen having the abilities to write on a conventional paper sheet. This digital pen is equipped with an electronic system capable of interpreting the pattern (position code) and of locating the position, in terms of the coordinates x and y, of what is in the course of being written.

On the other hand, the digital pen is additionally provided with a system for data transmission between itself and the IT processing unit, which system may be:
  a storage holder (of USB inkwell type) or
  a wireless communication protocol of Bluetooth or other type.

The system comprises the IT processing unit, which may be a computer of PC or Mac type functioning under any operating system (Windows, OSX, Linux, etc.), or a mobile phone having the abilities to execute IT programs, or any other system that can host the programs necessary for implementation of this invention.

The system also comprises a database that associates:
  a different number "ai" for each "master" page having address P(ai) used to implement this method.
  a different number "bj" for each "slave" page having address p(bj) used to implement this method.
  a different number "l" for each cell C(l) sampled in the "master" pages having address P(ai) to implement this method. a different number "J" for each cell c(J) sampled in the "slave" pages having address p(bj) to implement this method.
  a number "bj" for each identifier composed of a succession of numbers "ai" different from a1 and a2 (for example, 25.213.25.67 in the case of an identifier composed of seven patterned cells).
  the traces made by the user with the digital pen on the pattern of the content zone specific to each identifier, then recorded in the database.

This database may be installed locally in the IT processing unit or else remotely on a server.

Description of FIG. 4—Actions of the User

FIG. 4 is a flow chart representing a succession of instructions pertaining to filling out a sheet according to the present method, as seen from the viewpoint of the user.

Step 1: Designation of the Identifier

Using the digital pen, the user checks each cell of the identifier or traces a continuous line over these cells. The contour of the identifier preferably will be graphically visible to the user. By means of graphical indicators (simple geometric shapes such as squares, circles, etc.) it will also be possible to indicate graphically the location at which his line must begin and the location at which it must end.

Step 2: Writing Phase

Using the digital pen, the user writes handwritten data in the content zone belonging to the same sheet as the checked or traced identifier. Depending on the applications, the content zone will be blank or else structured by fields to be filled in, such as, for example: quality control forms, maintenance report forms, etc.

After this step, the user may recommence this process, that is to say on other sheets, as many times as necessary.

Step 3: Storage of the Pen and Transmission of Data

The user replaces the digital pen in its storage holder (of USB inkwell type), which initiates a succession of orders culminating in sending of the data stored in the memory of the digital pen to the IT processing unit.

In the case of use of a digital pen having the abilities to transmit data by a wireless communication protocol of the Bluetooth or other type, a dedicated patterned box will be checked on the paper sheet, the contour of which box will preferably be graphically visible to the user, who will initiate sending of the data stored in the memory of the digital pen to the IT processing unit.

This sequence of instructions will be respected by the user in the case of normal use. However, it is possible that the user makes manipulation errors, such as:

The case in which he checks/traces the cells of the identifier in the wrong order and/or in reverse before starting to write in the content zone.

The case in which the user checks/traces only part of the cells of the identifier before starting to write in the content zone.

The case in which the user forgets to check/trace the cells of the identifier before starting to write in the content zone.

In this context, in order to alleviate these potential errors, the automatic or semi-automatic methods for processing data that the IT processing unit has received from the digital pen will be described in the next section.

Description of FIG. 5—Internal Processing of the Data

The sequence of internal operations will now be described with reference to FIG. 5, constituting the second part of the method according to the invention.

Step 1: Data Transmission

When the digital pen receives the order to send its data to the IT processing unit (during replacement of the digital pen in the storage holder, such as a USB inkwell, or when a specific patterned box is checked to give the order to the pen to send its data by wireless communication protocol of the Bluetooth or other type), it transmits:

its unique identifier number (that of the digital pen being used), the number of pages having different addresses (P(ai) or p(bj) in the context of this method) traveled over by the digital pen during the operation in progress.

During this same time, for each page on which the digital pen has written, it transmits:

the address of the page (P(ai) or p(bj) in the context of this method).

the virtual surface of the page, by giving the coordinates (x min, y min) and (x max, y max), the number of traces present on the page in question ((one trace=everything that the pen writes between the moment at which the user applies the tip to the paper and the moment at which he lifts the tip from the paper) or (one trace=everything that the pen writes between the moment at which the user applies the writing tip to the paper and the moment at which the digital pen passes over a pattern having a different address)).

Simultaneously, for each trace made by the digital pen, it transmits:

the color of the line (parameter defined in the memory of the digital pen).

the line thickness (parameter defined in the memory of the digital pen).

the date of the start of each trace relative to the internal clock of the digital pen.

the duration of each trace (in milliseconds, for example).

the coordinates of all points captured by the digital pen in the course of the trace (during writing, the pen captures its position coordinates. Technically, it may capture up to 50 points per second).

and, with each captured point characterized by its coordinates (x, y), there is associated a variable quantifying the pressure (function of the force applied by the user on the digital pen and consequently of the force applied by the writing tip of this pen on the writing surface) on the one hand, and the time difference between the captured point and the preceding point.

Step 2: First Filtering of the Data.

An automatic unit A (FIG. 6), which travels over the data described in step 1, is used in chronological manner. The purpose of this automatic unit A is to detect the passage of the digital pen from one sheet to another between two discharges of data from the pen to the IT processing unit. It is a deterministic finished automatic unit defined by the quintuplet $A=(E, \Sigma, f, d, Q)$, where:

$E=\{E0, E1, E2\}$ is the set of states of the automatic unit.

$\Sigma=\{P(a1), \ldots, P(an), p(b1) \ldots, p(bm)\}$ is the set of addresses recognized by the automatic unit. The P(ai) for i from 1 to n being the addresses of the master pages. The p(bj) for j from 1 to m being the addresses of the slave pages.

f: $E \times \Sigma \to E$ being the transition function of the automatic unit.

d=E0 is the initial state of the automatic unit.

Q={E2} is the set of terminal states of the automatic unit. Namely, the state in which the automatic unit exists when it has undergone a transition from one sheet to another.

We then have the transition function of the automatic unit defined as follows:

f(E0, p(bk))=E1 when the automatic unit has recognized an address p(bk) associated with a slave page, f(E1, P(ai))=E1 for all i from 1 to n when the automatic unit has recognized any address P(ai) whatsoever associated with the master pages.

F(E1, P(bl))=E2 when the automatic unit has recognized an address p(bl) associated with a slave page different from p(bk).

The automatic unit A travels over the data received in step 1 in the time [from t(start_traces)=(date of the first trace after the preceding discharge of data of the digital pen) to t(end_traces)=(date of the last trace before transmission of the data contained in the memory of the digital pen to the IT processing unit)].

When the automatic unit arrives in state E2, it has detected that the digital pen has passed from one sheet to another. At this moment, this transition is not totally determined. In fact, it is not known whether the traces corresponding to the transitions of the automatic unit A from state E1 to state E1 once again (loop in FIG. 6) belong to the sheet containing the patterned content zone having the address p(bk) or to the sheet containing the patterned content zone having the address p(bl).

Groupings are then carried out in such a way that the traces corresponding to these indeterminate transitions of the automatic unit belong simultaneously to the group of traces that are known with certainty to belong to the sheet containing the patterned content zone having the address p(bk) and to the group of traces that are known with certainty to belong to the sheet containing the patterned content zone having the address p(bl). Since the automatic unit has traveled over all the traces in time, there will therefore be obtained between 1 and n groups of traces as a function in particular of the number of sheets filled in by the user. Thereafter the traces grouped in this way will be filtered once again in the next step.

Step 3: Second Filtering of the Data

A second phase of filtering of the traces group by group then follows.

In the context of this second filtering, there is pictured a virtual screen G divided into surface units S(k) (FIG. 7) defined according to the pair of the following coordinates [x(S(k)) beginning, y(S(k)) beginning; x(S(k)) end, y(S(k)) end] such that:

k ranges between 1 and n1 or k ranges between 1 and m1 with n1=m1.

x(S(k)) beginning=x(C(l)) beginning=x(c(J)) beginning.
y(S(k)) beginning=y(C(l)) beginning=y(c(J)) beginning.
x(S(k)) end=x(C(l)) end=x(c(J)) end.
y(S(k)) end=y(C(l)) end=y(c(J)) end.
by convention, k=l=J.

The traces T belonging to the group in the course of filtering are stacked chronologically and virtually on each surface unit S(k) in such a way that:

All the traces T of the group belonging to the cells C(l=1) are present in the surface unit S(k=1), the traces of the cell C(l=2) are present in the surface unit S(k=2) and so on up to l=400 and k=400 in the context of the example described in the section "Description of FIG. 2".

All the traces T of the group belonging to the cells c(J=1) are present in the surface unit S(k=1), the traces of the cell c(J=2) are present in the surface unit S(k=2) and so on up to J=400 and k=400 in the context of the example described in the section "Description of FIG. 2".

Thus, for example, if the user has performed, on the dates t0, t1, t2 (where t0<t1<t2), three traces T on the same cell C(l=1) having the address P(a1), there will be G(S(k=1))=[T(t0, P(a1), C(1)); T(t1, P(a1), C(1)); T(t2, P(a1), C(1))]. Stated otherwise, if writing takes place on corresponding cells, that is to say cells having the same coordinates, situated on one or two different sheets, the three traces will appear superposed and chronologically classified on virtual screen G.

Step 4: Processing Phase

For each group of traces T, processing includes a search through virtual screen G for the presence of an identifier.

For this purpose, an automatic unit B (FIG. 8) is applied by the IT processing unit on each group of traces T:

The recognition of an identifier will depend on the trajectory of reading of the traces T stored in S(k) on screen G. To recognize the horizontal identifiers, it will be possible, for example, to read the traces T stored in the screen by traveling over the surface units S(k) from left to right on the same row. For the vertical identifiers, the surface units S(k) will be traveled over from top to bottom on the same column. It will also be possible to use more complex travel schemes, by adding temporal data thereto, by traveling over only continuous traces, etc.

The automatic unit B making it possible to recognize an identifier is a deterministic finished automatic unit defined by the quintuplet B=(E, Σ, f, d, Q), where:

E={E0, E1, E2, E3} is the set of states of the automatic unit.
Σ={P(a1), . . . , P(an), p(b1) . . . , p(bm)} is the set of addresses recognized by the automatic unit.

P(a1) and P(a2) being the addresses of the master pages indicating the beginning and end of an identifier. The P(ai)≠P(a1)≠P(a2) for i from 3 to n being the addresses of the master pages composing the identifier. The p(bj) for j from 1 to m being the addresses of the slave pages.

f: E×Σ->E being the transition function of the automatic unit.
d=E0 is the initial state of the automatic unit.
Q={E3} is the set of terminal states of the automatic unit. Namely, the state in which the automatic unit exists when it has recognized an identifier.

We then have the transition function of the automatic unit defined as follows:

f(E0, P(a1))=E1
f(E1, P(ai))=E1 for all i from 3 to n.
f(E1, p(bj))=E2
f(E2, P(ai))=E2 for all i from 3 to n.
f(E2, P(a2))=E3

When the automatic unit arrives in state E3, it saves the identifier recognized in this way and also the address of the associated slave page, then it continues reading the traces T stored in the screen G in accordance with the chosen path.

If the automatic unit does not recognize any identifier, it will be possible for the IT processing unit to display an appropriate message destined for the user, to ask him, for example, to pass or re-pass the digital pen over the identifier of the sheet in question, in order that the traces belonging to the content zone having the address p(bj) can be associated with a valid identifier.

For each recognized identifier, the IT processing unit will verify, by looking up the database, that the latter exist with the associated slave patterns having the addresses p(bj). If this is not the case, the IT processing unit will verify whether ambiguity may exist in the recognition of the identifier. For example, the IT processing unit will verify the dates associated with the traces T. As the case may be, the IT control unit will display a message for the user informing him of an erroneous, invalid or insufficient acquisition and will prompt him to recommence the procedure of validation of the identifier.

The invention claimed is:

1. A method for constructing and composing, on at least one sheet, at least one identifier on the basis of at least one sampling of at least one cell in at least one page obtained from a general pattern, wherein said at least one sheet comprises a patterned content zone on which the hand of a user writes or makes graphical signs, said content zone is obtained by at least one sampling of at least one cell of said at least one page and wherein reading of said identifier is performed by means of a digital writing and reading instrument associated with said at least one sheet, said method comprising the steps of:

defining n "master" pages P having the address "P(ai)" (wherein 1<i<n), each divided into n1 cells "C(I)" (wherein 1<I<n1)" so as to form at least one part of said identifier by sampling of said at least one cell;

defining a special master page having the address "P(a1)" dedicated to the beginning of each identifier, in which there is sampled one cell "D" of the beginning of each constructed identifier;

defining a special master page having the address "P(a2)" dedicated to the end of each identifier, in which there is sampled one cell "F" of the end of each constructed identifier;

defining m "slave" pages "p" having the address "p(bj)" (wherein 1<j<m), each divided into m1 cells "c(J)" (wherein 1<J<m1) to form each content zone of each writing surface by sampling and grouping;

inserting, for a given sheet, between said first cell "D" and said last cell "F" of each identifier, a cell c(J) sampled in a slave page "p" whose address is identical to that of cells c(J) serving to constitute said content zone belonging to said given sheet;

inserting, for other cells C(l) of said identifier, which are neither said cell "D" said cell "F", nor said cell c(J), an address or addresses "P(ai)" in random manner or according to an algorithm;

choosing, for said cell c(J) of said identifier of said given sheet, and for all cells c(J) comprising said content zone of said given sheet, an address "p(bj)" in a random manner or according to an algorithm;

acquiring said identifier by passing said digital writing and reading instrument over all of said cells of said identifier;

using said content zone by writing with said digital writing and reading instrument in said content zone on said patterned paper so as to achieve a writing result;

sending said writing result in the form of a succession of data to an IT processing unit; and filtering and processing said data corresponding to said writing result before final use thereof.

2. The method according to claim 1, further comprising the step of:
forming said identifier by the juxtaposition of a plurality of patterned cells, each sampled on a master page P having a separate address, and by a beginning cell D and an ending cell F, each sampled in a separate special master page.

3. The method according to claim 2, further comprising the step of:
forming said identifier by the juxtaposition of at least five patterned cells, two of them sampled on a master page P having a separate address, and by a special cell sampled in a special slave page, completed by a beginning cell D and by an ending cell F, each sampled for the latter in a special master page.

4. The method according to claim 1, further comprising the step of:
creating a mark for the beginning of said identifier and a mark for the end of said identifier.

5. The method according to claim 4, wherein:
said marks for said beginning and said end of said identifier are respectively cells "D" and "F", sampled from said master page P in which there is inserted a cell c(J) sampled in a slave page "p".

6. The method according to claim 1, wherein:
said digital writing and reading instrument sends said data to said IT processing unit by the intermediary of a USB inkwell.

7. The method according to claim 1, wherein:
said digital writing and reading instrument sends said data to said IT processing unit by a wireless communication protocol.

8. The method according to claim 7, wherein:
said wireless communication protocol comprises Bluetooth.

9. The method according to claim 1, wherein a flow chart is formed by the following steps:

marking said identifier with said digital pen;

writing written and graphical data within said content zone, or filling in fields of a form established or printed within said content zone, by using said digital pen;

repeating said two preceding steps as many times as necessary on as many sheets as necessary;

replacing said digital pen in a digital pen storage holder;

transmitting said data, stored within the memory of said digital pen, to said IT processing unit, performing a first filtering operation of said data by an automatic unit A;

performing a second filtering by grouping and organizing said data upon a virtual screen G; and processing said data, grouped and organized upon said virtual screen G, by an automatic unit B.

10. The method according to claim 9, further comprising the steps of:
wherein said transmission said data, by said digital pen, comprises its unique identifier number; the number of pages having different addresses over which said digital pen traveled during said written and graphical data writing operation; for each page traveled over, its respective address, its virtual surface, and the number of traces; for each one of said traces, the color and thickness of the line, the date and the time of the beginning of said trace, the coordinates (x, y) of all the captured points belonging to a single one of said traces, and for each captured point, a variable corresponding to the force of the pressure of said digital pen upon said sheet, and the duration between two successive points;

performing a first filtering by allocation of each trace to the corresponding sheet and grouping;

performing a second filtering of said traces wherein said traces are ordered group by group and are then stacked chronologically upon each surface unit of said virtual screen G; and processing each group of said traces T by searching for the presence of a recognizable identifier, and if the identifier is not recognized, the user is prompted to validate it once again.

11. The method according to claim 9, wherein:
said filtering of said data is performed by an automatic unit A that travels over said data received from said digital pen so as to detect the passage of said digital pen from one sheet to another; and knowing said set of addresses of said master pages and said slave pages, said automatic unit A groups said data and stacks them chronologically in order so as to detect possible errors of the user.

12. The method according to claim 9, wherein:
said data processing is performed by said automatic unit B, which makes it possible to recognize an identifier, to save it with said address of said associated slave page and to prompt the user to revalidate it if it has not been recognized.

13. A system for constructing and composing, on at least one sheet, at least one identifier on the basis of at least one sampling of at least one cell in at least one page obtained from a general pattern, wherein said at least one sheet comprises a patterned content zone on which the hand of a user writes or makes graphical signs, said content zone is obtained by at least one sampling of at least one cell of said at least one page, and wherein reading of said identifier is performed by means of a digital writing and reading instrument associated with said at least one sheet, comprising:

a digital writing and reading instrument comprising a digital pen;

a writing tablet having at least one patterned paper sheet;

said at least one patterned paper sheet being provided with a patterned content zone, formed by sampling and grouping at least one cell C(I) sampled within at least one master page "P" having the address "P(ai), at least one cell c(J) sampled within at least one slave page "p" having the address p(bj), an identifier zone comprising the juxtaposition of cells sampled within said master pages "P" and within said slave pages "p" and provided if necessary with a patterned box to be validated for sending the data to an IT processing unit and with geometric graphical indicators of the beginning and end of zone;

an automatic unit A;

an automatic unit B;

a database, which associates a different number "ai" for each "master" page having an address P(ai); a different number "bj" for each "slave" page having an address p(bj); a different number "I" for each cell C(I) sampled within said "master" pages having address P(ai); a different number "J" for each cell c(J) sampled within said "slave" pages having an address p(bj); and a number "bj" for each identifier comprising a succession of numbers "ai" different from a1 and a2; wherein the traces made by the user with said digital pen upon said pattern of said content zone specific to each identifier can then recorded within said database.

14. The system according to claim 13, wherein:
said content zone is structured by fields to be filled in within forms and reports.

15. The system according to claim 13, wherein:
said digital writing and reading instrument is a digital pen comprising a pen body; a tip for writing upon plain paper and a viewing means of the reading micro-camera type; a digital system for interpreting said patterned content zone and locating the position of said writing tip according to coordinates x and y during said writing by said user; a storage holder that initiates the sending of data corresponding to the use thereof; an assembly for transmission of data between said digital pen and said IT processing unit; and a wireless communication protocol.

16. The system according to claim 13, wherein:
said IT processing unit comprises a micro-computer or a mobile telephone.

17. The system according to claim 13, wherein:
said automatic unit A is a deterministic finished automatic unit applied by said IT processing unit that performs filtering by traveling over said data so as to detect the passage of said digital pen from one sheet to another between two discharges of data to said IT processing unit, and is defined by the quintuplet A=(E, Σ, f, d, Q), wherein:

E={E0, E1, E2} is the set of states of the automatic processing unit A;

Σ={P(a1), ... , P(an), p(b1) ... , p(bm)} is the set of addresses recognized by said automatic processing unit A, P(ai) for i from 1 to n being the addresses of said master pages, and p(bj) for j from 1 to m being the addresses of said slave pages;

f: E×Σ->E being the transition function of said automatic processing unit A;

d=E0 is the initial state of said automatic processing unit A;

Q={E2} is the set of terminal states of said automatic processing unit A, that is, the state in which said automatic processing unit A exists when it has undergone a transition from one sheet to another, wherein the transition function of said automatic processing unit A is defined by:

f(E0, p(bk))=E1 when said automatic processing unit A has recognized an address p(bk) associated with a slave page;

f(E1, P(ai))=E1 for all i from 1 to n when said automatic processing unit A has recognized any address P(ai) whatsoever associated. with said master pages, by which said automatic processing unit travels over said data received in the time from t(start traces)=date of the first trace after a preceding discharge of data from said digital pen) to t(end traces)=date of the last trace before transmission of the data contained within said memory of said digital pen and sent to said IT processing unit.

18. The system according to claim 13, wherein:
said automatic unit B is a deterministic finished automatic unit applied by said IT processing unit to each group of traces by said digital pen for recognition of an identifier and is defined by the quintuplet A=(E, Σ, f, d, Q), wherein:

E={E0, E1, E2, E3} is the set of states of said automatic processing unit B;

Σ={P(al), ... , P(an), p(b1) ... ,p(bm)} is the set of addresses recognized by said automatic processing unit B, P(al) and P(a2) being the addresses of said master pages indicating the beginning and the ending of an identifier; and P(ai)≠P(a1)≠P(a2) for i from 3 to n being the addresses of said master pages comprising said identifier; with p(bj) for j from 1 to m being the addresses of said slave pages;

f: E×Σ->E being the transition function of said automatic processing unit B;

d=E0 is the initial state of said automatic processing unit B; and

Q={E3} is the set of terminal states of said automatic processing unit B that is, the state in which said automatic processing unit B exists when it has recognized an identifier, wherein said the transition function of said automatic processing unit B is defined by:

f(E0, P(a1))=E1;

f(El, P(ai))=E1 for all i from 3 to n;

f(El, p(bj))=E2;

f(E2, P(ai))=E2 for all i from 3 to n; and f(E2, P(a2))=E3.

19. The system according to claim 13, wherein:
said database contains the addresses P(ai) of each one of said master pages, the addresses p(bj) of each one of said slave pages, the number (l) of each cell C(l) sampled within said master pages, the number J of each cell c(J) sampled within slave pages, the numbers (bj) specific to each identifier, and the traces specific to each content zone performed by the user using said digital pen.

* * * * *